United States Patent
Seo et al.

(10) Patent No.: US 11,132,935 B2
(45) Date of Patent: Sep. 28, 2021

(54) CORRECTION PATTERN OBTAINING APPARATUS FOR CORRECTING NOISE GENERATED BY OPTICAL ELEMENT INCLUDED IN DISPLAY AND METHOD OF OBTAINING NOISE CORRECTION PATTERN USING THE SAME

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Wontaek Seo, Yongin-si (KR); Yongkeun Park, Daejeon (KR); Hoon Song, Yongin-si (KR); Jungkwuen An, Suwon-si (KR); Jongchan Park, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/574,856

(22) Filed: Sep. 18, 2019

(65) Prior Publication Data
US 2020/0294442 A1 Sep. 17, 2020

(30) Foreign Application Priority Data
Mar. 14, 2019 (KR) .......................... 10-2019-0029368

(51) Int. Cl.
*G09G 3/22* (2006.01)
*G02B 27/00* (2006.01)

(52) U.S. Cl.
CPC ............ *G09G 3/22* (2013.01); *G02B 27/0025* (2013.01); *G09G 2310/0213* (2013.01); *G09G 2320/0276* (2013.01)

(58) Field of Classification Search
None
See application file for complete search history.

(56) References Cited

U.S. PATENT DOCUMENTS 7,283,139 B1 * 10/2007 Tanaka ...................... G06F 3/14
345/581
7,724,942 B2 5/2010 Bryll
(Continued)

FOREIGN PATENT DOCUMENTS

| KR | 10-2005-0089307 A | 9/2005 |
| KR | 10-2014-0071638 A | 6/2014 |
| KR | 10-1800929 B1 | 11/2017 |

OTHER PUBLICATIONS

Seungwoo Shin et al., "Reference-free single-point holographic imaging exploiting time-reversal symmetry of light scattering", Department of Physics, Korea Advanced Institute of Science and Technology, Apr. 30, 2018, pp. 1-8 (8 pages total).

*Primary Examiner* — Matthew Yeung
(74) *Attorney, Agent, or Firm* — Sughrue Mion, PLLC

(57) ABSTRACT

Provided are correction pattern obtaining apparatuses and methods of obtaining a correction pattern by using the correction pattern obtaining apparatuses. The correction pattern obtaining apparatus includes a flat panel display having an optical element that receives one or more input test patterns, a detector that measures intensity of light emitted from the flat panel display corresponding to each of the one or more input test patterns and a processor that determines a correction pattern comprising one or more of
(Continued)

the one or more test patterns at a given ratio based on the measured intensity of light corresponding to each of the one or more input test patterns.

37 Claims, 6 Drawing Sheets

(56) References Cited

U.S. PATENT DOCUMENTS

| | | | |
|---|---|---|---|
| 9,851,693 B2 | 12/2017 | Park et al. | |
| 2005/0195705 A1 | 9/2005 | Shin et al. | |
| 2007/0285663 A1* | 12/2007 | Hewitt | H04N 13/346 |
| | | | 356/399 |
| 2016/0093269 A1* | 3/2016 | Buckley | G09F 9/30 |
| | | | 345/501 |
| 2017/0122725 A1* | 5/2017 | Yeoh | G06T 15/20 |
| 2017/0146427 A1 | 5/2017 | Liang | |
| 2017/0169747 A1* | 6/2017 | Richards | G09G 3/006 |

* cited by examiner

CORRECTION PATTERN OBTAINING APPARATUS FOR CORRECTING NOISE GENERATED BY OPTICAL ELEMENT INCLUDED IN DISPLAY AND METHOD OF OBTAINING NOISE CORRECTION PATTERN USING THE SAME

CROSS-REFERENCE TO RELATED APPLICATION

This application is based on and claims priority from Korean Patent Application No. 10-2019-0029368, filed on Mar. 14, 2019, in the Korean Intellectual Property Office, the disclosure of which is incorporated herein in its entirety by reference.

BACKGROUND

1. Field

The disclosure relates to correction pattern obtaining apparatuses to correct or remove optical noise generated by an optical element and methods of obtaining a correction pattern, and more particularly, to correction pattern obtaining apparatuses for correcting noise by an optical element included in a display and methods of obtaining a noise correction pattern using the correction pattern obtaining apparatuses.

2. Description of the Related Art

Generally, displays have a structure in which a display panel and optical members are combined. In order to reproduce an accurate image, efforts have been conducted to measure noise generated in an optical member included in a display and to address the noise problem.

A field lens (for example, a Fresnel lens) used in a flat panel holographic display includes a discrete structure unlike a general lens having a continued structure that is overall softly connected. Accordingly, when a holographic image is formed, noise by a mechanical structure (for example, scattering by an apex, noise by a draft slope, or noise by a machining tolerance) may appear.

SUMMARY

Provided are correction pattern obtaining apparatuses for correcting noise generated by an optical element included in a corresponding display by using a display of a finished product.

Provided are methods of obtaining a noise correction pattern by using the correction pattern obtaining apparatus.

Additional aspects will be set forth in part in the description which follows and, in part, will be apparent from the description, or may be learned by practice of the embodiments of the disclosure.

According to an aspect of the disclosure, there is provided a correction pattern obtaining apparatus comprising: a flat panel display comprising an optical element that receives one or more input test patterns; a detector configured to measure intensity of light emitted from the flat panel display corresponding to each of the one or more input test patterns; and a processor configured to determine a correction pattern comprising one or more of the one or more test patterns at a given ratio based on the measured intensity of light corresponding to each of the one or more input test patterns.

The flat panel display may further comprise: a light source configured to emit parallel light or non-parallel light; a flat panel that receives the parallel light or the non-parallel light from the light source; and the optical element through which the parallel light or non-parallel light passes, wherein the correction pattern may be determined based on a characteristic of the optical element.

The detector may comprise an optical sensor, a size of the optical sensor being less than a diffraction limited spot of the optical element.

The correction pattern obtaining apparatus may further comprise an element configured to limit light incident to the detector to a single mode, the element being arranged between the flat panel display and the detector.

The correction pattern obtaining apparatus may further comprise a beam splitter configured to split light emitted from the flat panel display into a first direction and a second direction; a lens; and an image pickup device, wherein the detector is arranged in the first direction, and wherein the lens and the image pickup device are arranged in the second direction.

The flat panel may comprise a holographic display panel.

The optical element may comprise a Fresnel lens.

The optical element may be arranged between the light source and the flat panel.

The optical element may be arranged between the flat panel and the detector.

The element may comprise a pinhole mask.

The element may comprise an optical fiber; and a lens that focuses light incident from the flat panel display onto the optical fiber.

According to another aspect of the disclosure, there is provided a method of obtaining a correction pattern, the method comprising: sequentially inputting one or more input test patterns that are different from each other to a flat panel display comprising an optical element that receives the one or more test patterns; measuring intensity of light emitted from the flat panel display with respect to each of the one or more input test patterns; and determining a correction pattern comprising one or more of the one or more input test patterns at a given ratio based on the measured intensities of light.

The intensity of light corresponding to each of the one or more input test patterns may be measured by using a detector, wherein an element may be configured to limit light incident to the detector to a single mode is arranged between the detector and the flat panel display, and wherein the one or more test patterns may comprise two or more test patterns that are different from each other.

The flat panel display may comprise: a light source configured to emit parallel light or non-parallel light; a flat panel that receives the parallel light or the non-parallel light enters from the light source; and the optical element through which the parallel light or the non-parallel light passes, wherein the correction pattern may be determined based on a characteristic of the optical element.

The one or more input test patterns may comprise holographic patterns.

The method may further comprise: splitting, by a beam splitter, light emitted from the flat panel display into a first direction and a second direction, wherein the detector is arranged in the first direction, and a lens and an image pickup device are arranged in the second direction.

The method may further comprise confirming a change in light-noise generated from the optical element through the image pickup device before determining the correction pattern.

The element may comprise a pinhole mask.

The element may comprise an optical fiber; and a lens that focuses light incident from the flat panel display onto the optical fiber.

The flat panel may comprise a holographic display panel.

The optical element may comprise a Fresnel lens.

The optical element may be arranged between the light source and the flat panel.

The optical element may be arranged between the flat panel and the detector.

According to another aspect of the disclosure there is provided a method of obtaining a correction pattern, the method comprising: inputting a test pattern to a flat panel display comprising an optical element that receives the test pattern; measuring intensity of light emitted from the flat panel display with respect to the input test pattern; varying the test pattern after measuring the intensity of the light; and determining a correction pattern based on intensity of light emitted from the flat panel display corresponding to the varied the test pattern.

After the varying of the test pattern, the varied test pattern may be input to the flat panel display, and the inputting, the measuring, and the varying may be repeated until a final correction pattern is determined.

The test pattern may comprise a holographic pattern.

The varying of the test pattern may comprise moving the test pattern in a given direction.

The varying of the test pattern may comprise changing a part of the test pattern.

The intensity of light may be measured by using a detector, and an element configured to limit light incident to the detector to a single mode is arranged between the detector and the flat panel display.

The flat panel display may comprise a light source configured to emit parallel light or non-parallel light; a flat panel that receives the parallel light or the non-parallel light enters from the light source; and the optical element through which the parallel light or the non-parallel light passes, wherein the correction pattern may be determined based on a characteristic of the optical element.

The method may further comprise splitting, by a beam splitter, light emitted from the flat panel display into a first direction and a second direction, wherein the detector may be arranged in the first direction and the lens and the image pickup device are arranged in the second direction.

The element may comprise a pinhole mask.

The element may comprise an optical fiber; and a lens that focuses light incident from the flat panel display onto the optical fiber.

The flat panel may comprise a holographic display panel.

The optical element may comprise a Fresnel lens.

The optical element may be arranged between the light source and the flat panel.

The optical element may be arranged between the flat panel and the detector.

The method may further comprise: confirming a change in light-noise generated from the optical element through the image pickup device before determining the correction pattern.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
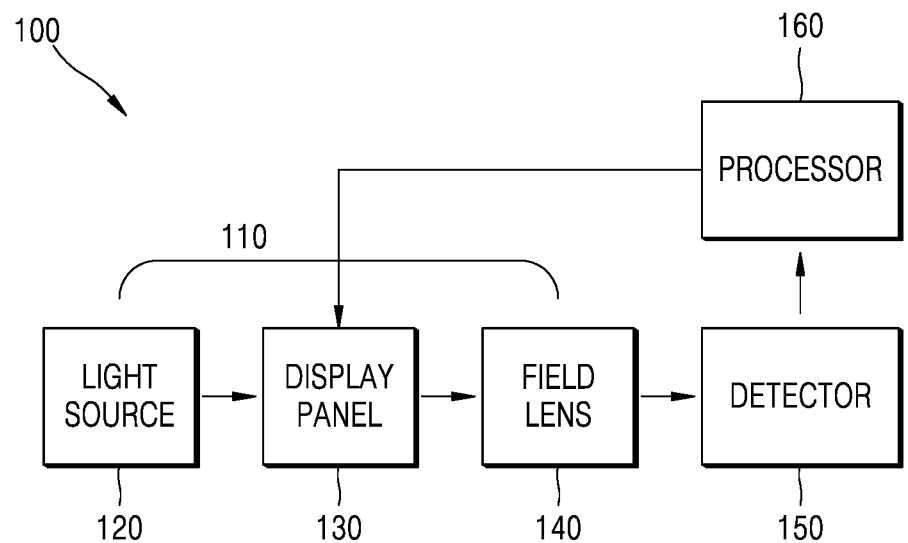
FIG. 1 is a schematic block diagram of a correction pattern obtaining apparatus for correcting noise generated by an optical element included in a display, according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In order to realize a Fresnel lens having a high degree of completion, a path difference of light passing through upper and lower portions of discrete parts of the lens must be an integer multiple of a wavelength of the light. However, it is not easy to manufacture a precision lens having an accuracy of a level (a few hundreds of nanometers in a visible light region) of a wavelength of light, and a tolerance is always present.

Also, noise generated by the Fresnel lens is changed according to wavelength components of light incident to the Fresnel lens. Accordingly, in order to optically correct the noise of the Fresnel lens, the characterization of all Fresnel lenses that are used is required, and an alignment between a display panel and the Fresnel lens is also important.

The measurement technique of a transmission matrix of the Fresnel lens of the related art requires complicated optical equipment like an optical interferometer. In particular, in order to measure an interference image by using a camera, a well-defined reference beam is required. Also, for the characterization of a large area transmission matrix, a large area optical member is used, and an aberration generated in the large area optical member may not be ignored.

The disclosure performs optical correction with respect to noise generated from an optical element like a Fresnel lens. According to an embodiment, the characterization of the Fresnel lens and optical correction in a holographic display device of a finished product state are possible.

In relation to the performances described above, correction pattern obtaining apparatuses for correction of noise generated by an optical element included in a display, according to embodiments and methods of obtaining a noise correction pattern by using the same will be described in detail with reference to the accompanying drawings. In the drawings, thicknesses of layers or regions are exaggerated for clarity of the specification.

FIG. 1 is a schematic block diagram of a correction pattern obtaining apparatus 100 for correcting noise generated by an optical element included in a display;

Referring to FIG. 1, the correction pattern obtaining apparatus 100 may include a display 110, a detector 150, and a processor 160. The display 110 may include a flat panel display, for example, a flat panel holographic display. The display 110 may include a light source 120, a flat display panel 130, and a field lens 140. The light source 120, the flat display panel 130, and the field lens 140 may be arranged in an order depicted in FIG. 1, but in another embodiment, the components of the display 110 may be arranged in a different order. For instance, the field lens 140 may be located between the light source 120 and the flat display panel 130.

The light source 120 may emit parallel light towards the flat display panel 130. As an example, the light source 120 may emit parallel light having coherency, for example, laser light. The flat display panel 130 may be a holographic display panel or may include a holographic display panel. The field lens 140 may include, as an example, a Fresnel lens, but is not limited thereto. In another embodiment, the field lens 140 may include an element (for example, a turbid medium) that may perform the same functions as the Fresnel lens. The detector 150 may measure a characteristic, for example, intensity of light emitted from the display 110 by receiving the light emitted from the display 110. The detector 150 may include, for example, a photodiode, but is not limited thereto. An optical element that may perform photoelectric conversion by receiving light may be used as the detector 150. The processor 160 may perform an optical computation based on an optical signal provided from the detector 150, and may input various test patterns to the flat display panel 130. At this point, the test patterns may be holographic patterns used for finding a correction pattern for correcting noise of the field lens 140. The measurement of the intensity of light received by the detector 150 may be performed in the processor 160. That is, the detector 150 may receive light emitted from the display 110, and may provide an optical signal, that is, an electrical signal corresponding to the received light that is generated by the photoelectric conversion to the processor 160. The processor 160 may determine the intensity of light detected by the detector 150 based on the optical signal that is provided from the detector 150. The processor 160 may include a computer to perform the functions described above.

Figure 2:
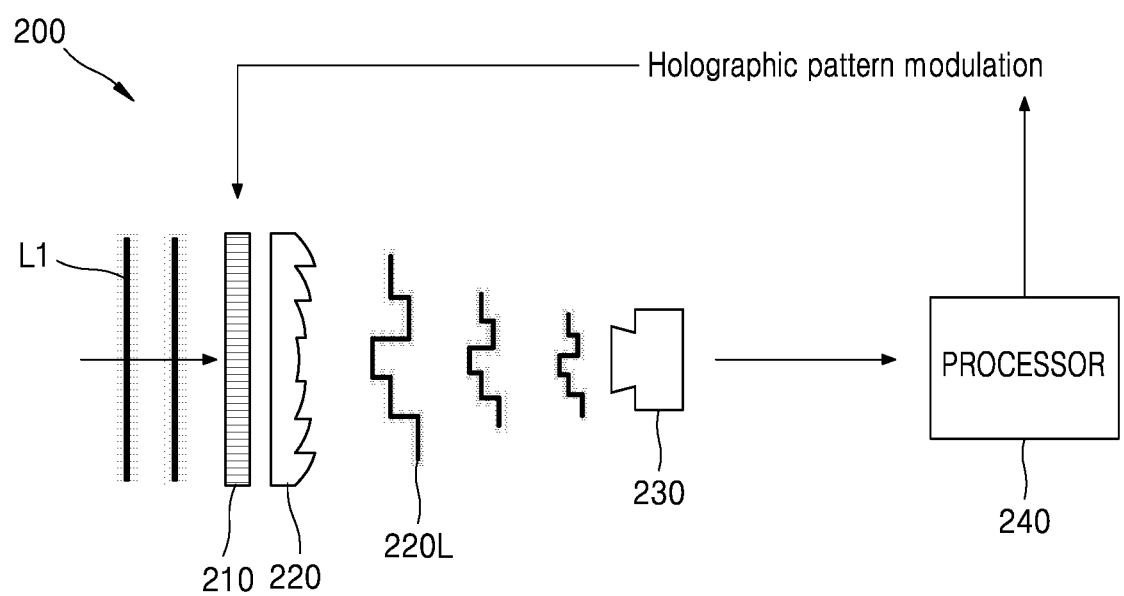
FIG. 2 is a cross-sectional view of the correction pattern obtaining apparatus of FIG. 1 according to an embodiment.

FIG. 2 is a cross-sectional view of the correction pattern obtaining apparatus 100 of FIG. 1 according to an embodiment. Referring to FIG. 2, a first correction pattern obtaining apparatus 200 includes a Fresnel lens 220 arranged between a holographic display panel 210 and a detector 230. Parallel light L1 having coherency enters the holographic display panel 210. According to an embodiment, the Fresnel lens 220 arranged on a right side of the holographic display panel 210 (i.e., the Fresnel lens 220 may be arranged between the holographic display panel 210 and the detector 230). According to another embodiment, the Fresnel lens 220 may be arranged on a left side of the holographic display panel 210 (i.e., the Fresnel lens 220 may be arranged between the light source emitting the parallel light L1 and the holographic display panel 210 and the detector 230). Regardless of the side on which the Fresnel lens 220 is arranged, the parallel light L1 emitted from a light source passes through the Fresnel lens 220, and thus, optical noise generated from the Fresnel lens 220 may be reflected to light 220L entering the detector 230. At this point, the size of a diffraction limited spot of the light 220L may be greater than an optical sensor included in the detector 230. Accordingly, an optical signal measured in the detector 230 may be a single mode optical signal. The parallel light L1 emitted from the light source and noise generated from the Fresnel lens 220 are included in the light 220L incident to the detector 230 through the Fresnel lens 220. When a holographic pattern is input to the holographic display panel 210 from a processor 240, the light 220L received by the detector 230 may be light in which the holographic pattern and the noise are overlapped. The optical noise generated by the Fresnel lens 220 may be constant, and thus, the intensity received in the detector 230 may vary according to the kind of the holographic pattern. A holographic pattern that may remove or minimize noise generated from the Fresnel lens 220, that is, a holographic pattern suitable for correcting the noise may be gained by measuring and comparing optical characteristics (for example, light intensity) as a result of inputting various holographic patterns to the holographic display panel 210. In this manner, a correction pattern suitable for correcting the noise may be gained. For this purpose, the processor 240 may input various holographic patterns initially set to the holographic display panel 210. At this point, the holographic patterns may be input to the holographic display panel 210 as electrical signals, for example, voltage signals.

Figure 3:
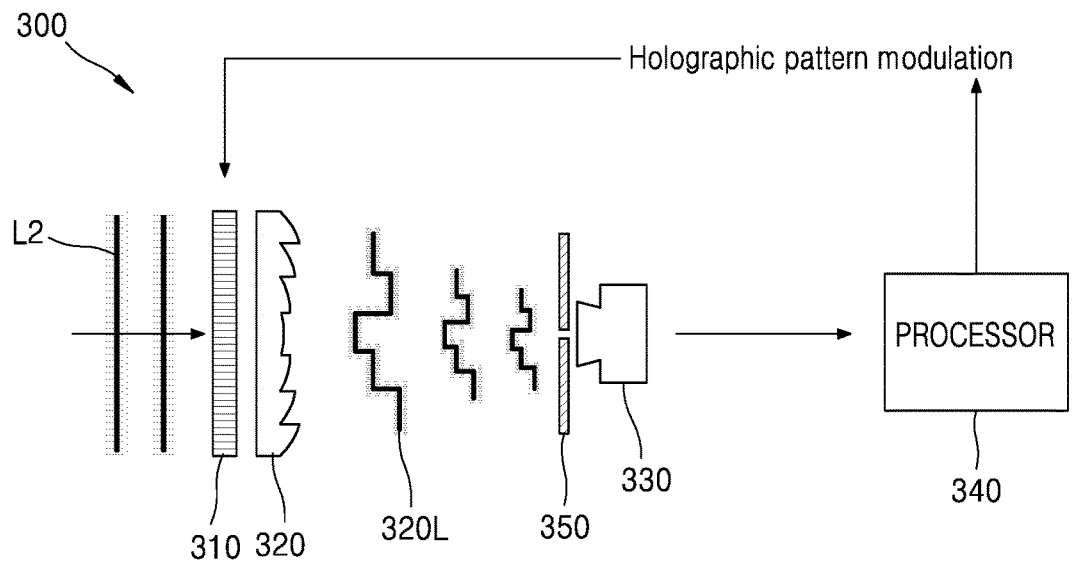
FIG. 3 is a cross-sectional view of the correction pattern obtaining apparatus of FIG. 1 according to another embodiment.

FIG. 3 shows another example of embodying the correction pattern obtaining apparatus 100 of FIG. 1. Referring to FIG. 3, a second correction pattern obtaining apparatus 300 may include a Fresnel lens 320 and a pinhole mask 350 arranged between a holographic display panel 310 and a detector 330. The pinhole mask 350 is arranged close to the detector 330, and thus, performs a function of limiting a spot size of light incident to the detector 330. That is, the pinhole mask 350 limits the spot size of light 320L incident to the detector 330 to a diffraction limited spot size. Accordingly, even though a spot size of converging light 320L through the Fresnel lens 320 is less than a size of an optical sensor included in the detector 330, only single mode optical signal may enter the detector 330. An optical element (for example, a turbid medium) that may perform the same function as the pinhole mask 350 may be used as the pinhole mask 350. A size of the optical sensor included in the detector 330 may be greater than the size of the diffraction limited spot of the incident light 320L. The holographic display panel 210, the Fresnel lens 220, and the processor 240 of FIG. 2 may be used as the holographic display panel 310, the Fresnel lens 320, and a processor 340. Parallel light L2 incident to the holographic display panel 310 may be the same as the parallel light L1 of FIG. 2.

Figure 4:
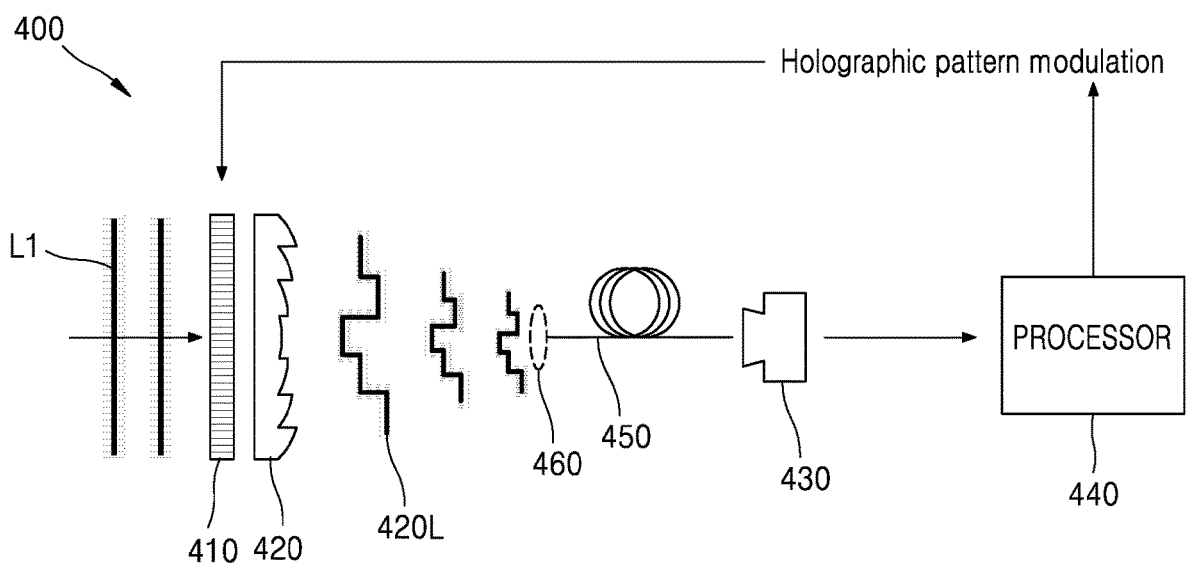
FIG. 4 is a cross-sectional view of the correction pattern obtaining apparatus of FIG. 1 according to another embodiment.

FIG. 4 shows another example of embodying the correction pattern obtaining apparatus 100 of FIG. 1. Referring to FIG. 4, a third correction pattern obtaining apparatus 400 may include a Fresnel lens 420 and an optical fiber 450 between a holographic display panel 410 and a detector 430. The optical fiber 450 performs a function of limiting a spot size of light incident to the detector 430. That is, the optical fiber 450 may perform a function equivalent to the pinhole mask 350 of FIG. 2. In detail, the optical fiber 450 may be provided to limit a spot size of light 420L incident to the detector 430 to the diffraction limited spot size. For this purpose, a lens 460 that may form a diffraction limited spot with respect to the incident light 420L may be arranged right ahead of an end of the optical fiber 450 to which the light 420L enters. The lens 460 may directly contact the optical fiber 450. Since the optical fiber 450 is provided, even though a spot size of converging light 420L through the Fresnel lens 420 is less than a size of an optical sensor included in the detector 430, only single mode optical signal may incident to the detector 430. An optical element that may perform a function equivalent to the optical fiber 450 may be used instead of the optical fiber 450. The size of the optical sensor included in the detector 430 may be greater than the size of a diffraction limited spot of the incident light 420L. The holographic display panel 210, the Fresnel lens 220, and the processor 240 of FIG. 2 may be used as the holographic display panel 410, the Fresnel lens 420, and a processor 440. Parallel light L3 incident to the holographic display panel 410 may be the same as the parallel light L1 of FIG. 2.

Figure 5:
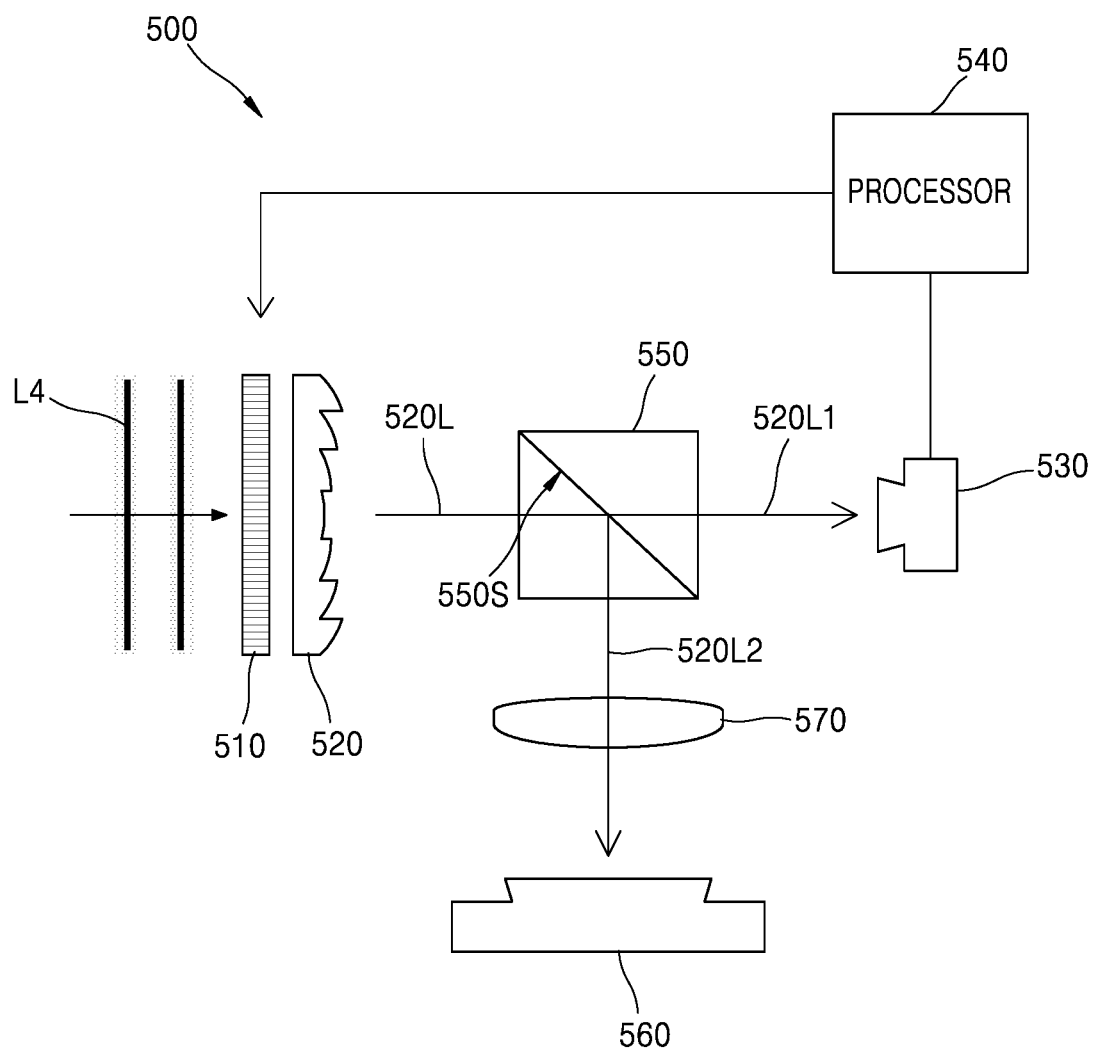
FIG. 5 is a cross-sectional view of the correction pattern obtaining apparatus of FIG. 1 according to another embodiment.

FIG. 5 shows another example of embodying the correction pattern obtaining apparatus 100 of FIG. 1. Referring to FIG. 5, a fourth correction pattern obtaining apparatus 500 may include a Fresnel lens 520 and a beam splitter 550 that are sequentially arranged between a holographic display panel 510 and a detector 530. The holographic display panel 510, the Fresnel lens 520, the beam splitter 550, and the detector 530 may be arranged in a row on the same optical axis. The correction pattern obtaining apparatus 500 also may include an image pickup device 560, a lens 570, and a processor 540. The image pickup device 560 and the lens 570 are arranged in a row in a direction perpendicular to the optical axis. The lens 570 is arranged between the beam splitter 550 and the image pickup device 560. A second light 520L2 of light split from the beam splitter 550 may be converged to the image pickup device 560 by the lens 570. The lens 570 may be a convex lens or other optical element (for example, a meta lens) that performs functions equivalent to the convex lens. The image pickup device 560 may be provided for imaging an optical noise generated by the Fresnel lens 510, for example, an interference pattern generated by the discrete structure of the Fresnel lens 510. The image pickup device 560 may be, for example, a charge coupled device (CCD), but is not limited thereto.

The beam splitter 550 may split light 520L incident through the Fresnel lens 520 into a first light 520L1 and the second light 520L2. The first light 520L1 passes through the beam splitter 550 and is incident to the detector 530. The second light 520L2 is reflected by a divided surface 550S of the beam splitter 550, travels in a direction perpendicular to the traveling direction of the first light 520L1, and enters the image pickup device 560 through the lens 570. The amount or the light intensity of the first light 520L1 may be measured by the detector 530, and the interference pattern by the Fresnel lens 520 may be detected by the image pickup device 560 as described above. The pinhole mask 350 of FIG. 3 or the optical fiber 450 of FIG. 4 may be arranged in front of the detector 530. The holographic display panel 210, the Fresnel lens 220, and the processor 240 of FIG. 2 may be used as the holographic display panel 510, the Fresnel lens 520, and the processor 540. Parallel light L4 incident to the holographic display panel 510 may be the same as the parallel light L1 of FIG. 2. The detector 530 may be the detector 230 of FIG. 2, the detector 330 of FIG. 3, or the detector 430 of FIG. 4.

Optical noise of the Fresnel lens 520, for example, an inherent interference pattern generated due to the discrete structure of the Fresnel lens 520 is recorded in the image pickup device 560, and thus, when there is a holographic pattern in which the intrinsic interference pattern disappears or is minimized in a process of inputting various holographic patterns to the holographic display panel 510 from the processor 540, the corresponding holographic pattern may be determined as a correction pattern for correcting the intrinsic interference pattern of the Fresnel lens 520.

Figure 6:
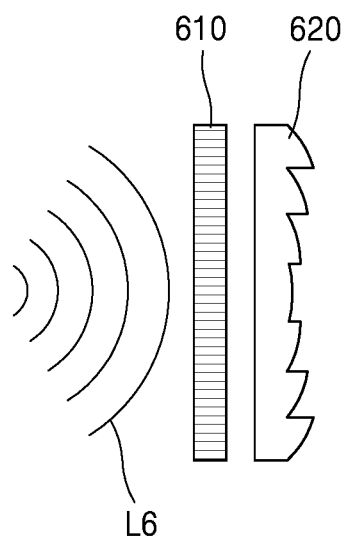
FIG. 6 is a cross-sectional view of a case when non-parallel light (for example, divergent light) enters a holographic display in the correction pattern obtaining apparatus of FIG. 1 according to another embodiment.

FIG. 6 shows a case when divergent light L6 enters a holographic display 610 in the correction pattern obtaining apparatus 100 of FIG. 1 according to an embodiment. The divergent light L6 may be an example of non-parallel light that may enter the holographic display 610. In FIG. 6, constituent elements arranged on a right side of a Fresnel lens 620 are omitted for convenience, and may be the same as the constituent elements arranged on a right side of any one of the Fresnel lenses 220, 320, 420, and 520 of FIGS. 2 through 5.

In FIG. 6, the holographic display 610 may be one of the holographic displays 210, 310, 410, and 510 of FIGS. 2 through 5. The Fresnel lens 620 may be one of the Fresnel lenses 220, 320, 420, and 520 of FIGS. 2 through 5. Next, a method of obtaining a correction pattern using the correction pattern obtaining apparatuses according to the embodiments described above will be described.

The method of obtaining a correction pattern according to an embodiment includes: a process of inputting a plurality of set test patterns (holographic patterns) in a correction pattern obtaining apparatus; and a process of obtaining a holographic pattern at which light intensity is maximum based on the light intensity measured through each of the input processes.

Figure 7:
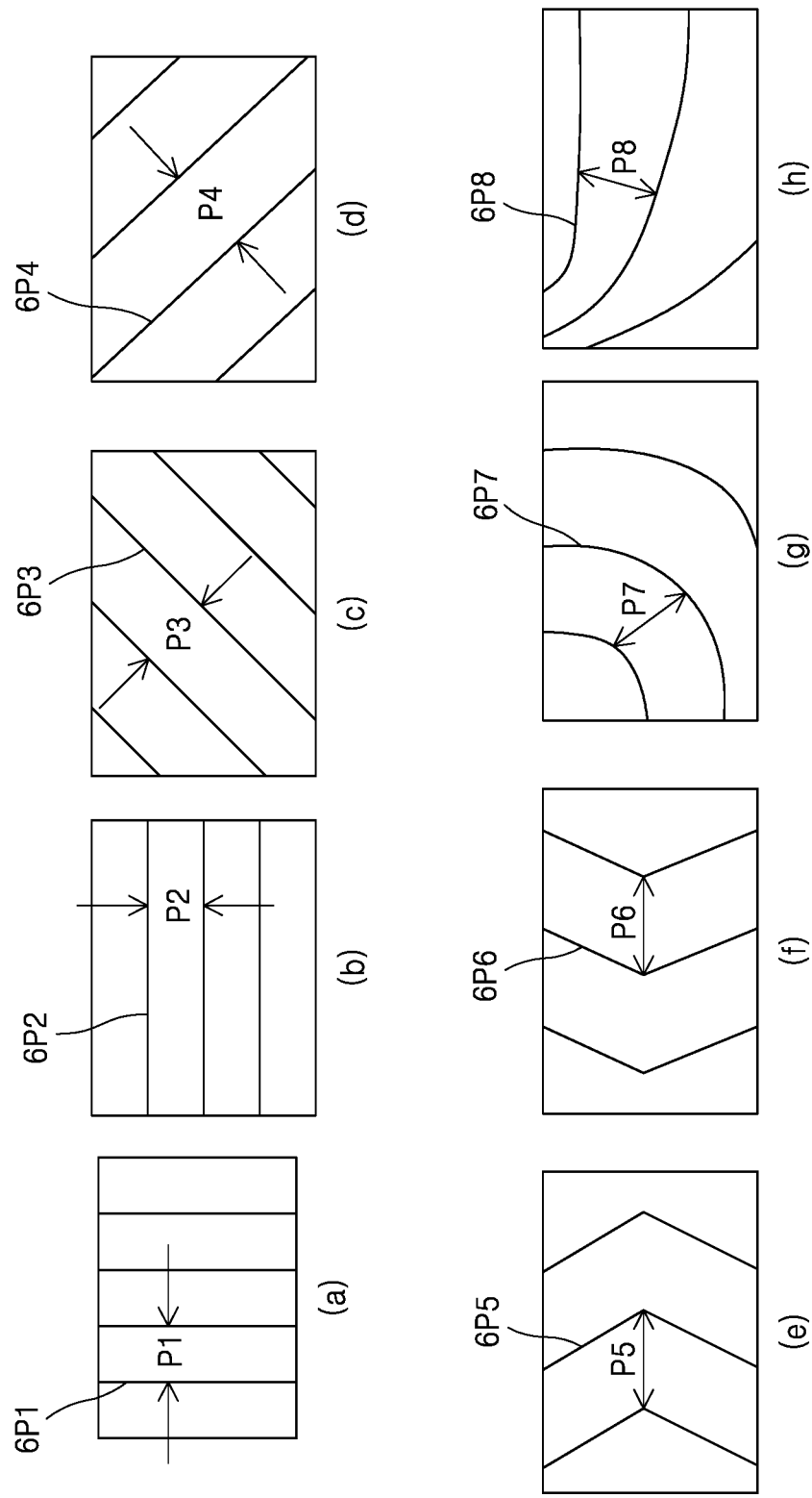
FIG. 7 is a plan view illustrating a plurality of test patterns (holographic patterns) input to a correction pattern obtaining apparatus in a method of obtaining a correction pattern by using the correction pattern obtaining apparatus according to an embodiment.

FIG. 7 is a diagram illustrating a plurality of holographic patterns (first through eighth holographic patterns 6P1 through 6P8) as test patterns inputting to a correction pattern obtaining apparatus in a method of obtaining a correction pattern (hereinafter, a first obtaining method) using a correction pattern obtaining apparatus according to the embodiment. The types and the number of the holographic patterns that are input to a holographic display panel are not limited to the types and number depicted in FIG. 7, and there are further various types of the holographic patterns and the number may be greater or less than eight.

The first through eighth holographic patterns 6P1 through 6P8 may be arbitrary orthonormal patterns. That is, the first and second holographic patterns 6P1 and 6P2 may perpendicularly cross each other, the third and fourth 6P3 and 6P4 may also perpendicularly cross each other, the fifth and sixth holographic patterns 6P5 and 6P6 may also perpendicularly cross each other, and the seventh and eighth holographic patterns 6P7 and 6P8 may also perpendicularly cross each other.

The first obtaining method may be performed by using a correction pattern obtaining apparatus described above, for example, the second correction pattern obtaining apparatus 300 of FIG. 3.

In detail, the first holographic pattern 6P1 of FIG. 7 is input to the holographic display panel 310 of the second correction pattern obtaining apparatus 300 through the processor 340, light that has passed through the holographic display panel 310 to which the first holographic pattern 6P1 is input and the Fresnel lens 320 is detected by the detector 330, and the intensity of light detected by the detector 330 may be measured by the detector 340 or the processor 340. This process may be performed with respect to all other second through eighth holographic patterns 6P2 through 6P8. After measuring the light intensities for the first through eighth holographic patterns 6P1 through 6P8, a holographic pattern that shows the maximum light intensity may be gained based on the measured data. The holographic pattern that shows the gained maximum light intensity may be a pattern including the first through eighth holographic patterns 6P1 through 6P8 at a certain ratio. For example, the holographic pattern that shows the maximum light intensity may include the first holographic pattern 6P1 at a certain ratio (for example, 5%), the second holographic pattern 6P2 at a certain ratio (for example, 10%), the third holographic pattern 6P3 at a certain ratio (for example, 3%), and, in a similar manner, the fourth through eighth holographic patterns 6P4 through 6P8 may also be included at certain ratios.

The gained holographic pattern that shows the maximum light intensity may be a final correction pattern to be used for correcting optical noise of the Fresnel lens 320. Accordingly, a clean holographic image in which the intrinsic interference pattern of the Fresnel lens 320 is corrected (removed) may be provided to viewers by applying the gained holographic pattern that shows the maximum light intensity to the holographic display while displaying an image given to the holographic display.

The method of obtaining the correction pattern described above uses a holographic display of a finished product type, and thus, it is unnecessary to separate only the Fresnel lens, and the method of obtaining the correction pattern may be performed regardless of the size of the Fresnel lens. Accordingly, a correction pattern may be easily gained not only for a Fresnel lens of a small diameter but also for a Fresnel lens of a large diameter.

In the method of obtaining a correction pattern described above, the fourth correction pattern obtaining apparatus 500 of FIG. 5 may be used. In this case, the variation of noise of the Fresnel lens 520 according to the input of each of the first through eighth holographic patterns 6P1 through 6P8 may be observed through the image pickup device 560.

Meanwhile, in the first through eighth holographic patterns 6P1 through 6P8, pitches P1 through P8 of the first through eighth holographic patterns 6P1 through 6P8 respectively may be controlled. Accordingly, the first through eighth holographic patterns 6P1 through 6P8 may become eight or more holographic patterns.

Figure 8:
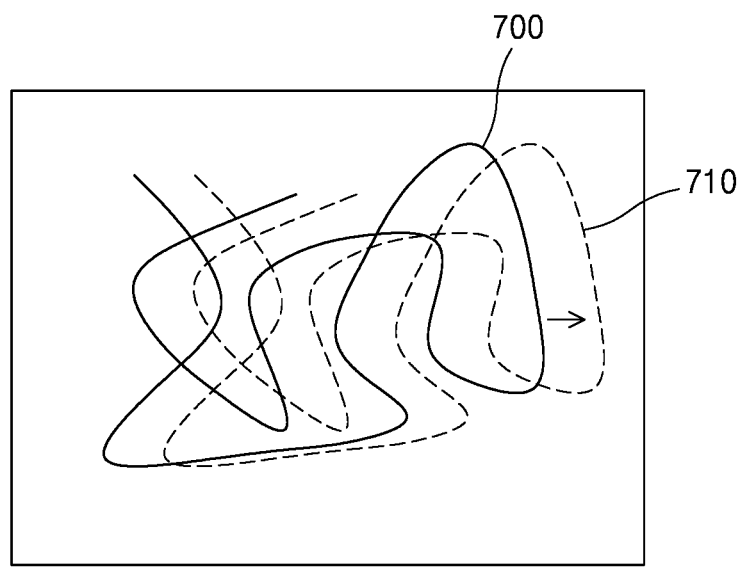
FIGS. 8 and 9 are plan views showing variation of holographic patterns used in a method of obtaining a correction pattern according to another embodiment (an iteration method) in which the correction pattern obtaining apparatus of FIGS. 2 through 5 are used.
Figure 9:
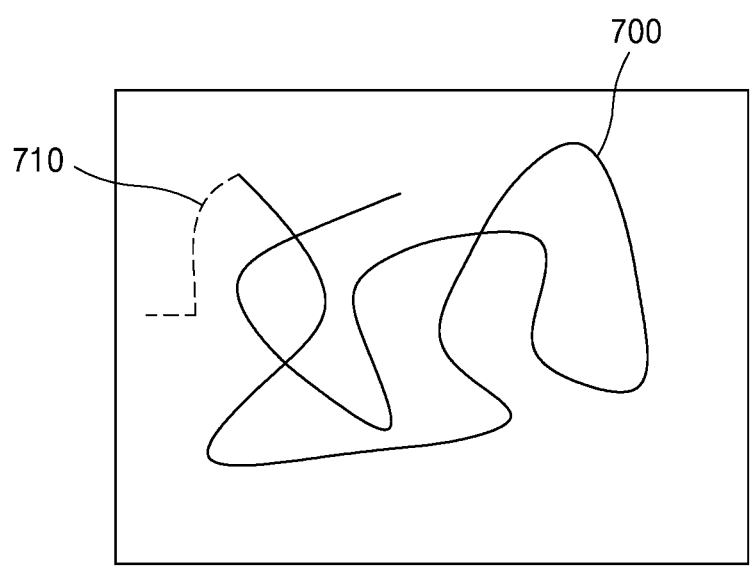

FIGS. 8 and 9 show variation of holographic patterns used in a method of obtaining a correction pattern using a correction pattern obtaining apparatus according to another embodiment. In other words, FIGS. 8 and 9 show the variation of the holographic pattern every time whenever the process is repeated in the method of obtaining a correction pattern to which an iteration method is applied.

Also, in this method, the correction pattern obtaining apparatus described above may be used, and, as an example, the method will be described by using the second correction pattern obtaining apparatus 300 of FIG. 3. In the second correction pattern obtaining apparatus 300, a first holographic pattern 700 of FIG. 8 may be input to the holographic display panel 310 through the processor 340. The first holographic pattern 700 may be an arbitrarily set pattern. After the first holographic pattern 700 is input, light 320L passed through the holographic display panel 310 and the Fresnel lens 320 is detected by the detector 330. Next, a second holographic pattern 710 which is a result of moving the first holographic pattern 700 in a given direction, for example, in a right direction by a given distance is input to the holographic display panel 310, and afterwards, the intensity of the light 320L may be detected by the detector 330. Based on the detection result, the next moving direction of the second holographic pattern 710 may be predicted or determined. Alternatively, as depicted in FIG. 9, a part of the first holographic pattern 700 may be modified based on the detection result. In FIG. 9, reference numeral 700a indicates a part of an end of the first holographic pattern 700 extending in a given direction by a given length.

In this manner, a holographic pattern at which the light intensity is maximized may be found by repeating the process varying the initially input first holographic pattern 700, that is, the process of moving and/or modifying the initially input first holographic pattern 700.

Meanwhile, when the method of obtaining a correction pattern is performed by using the fourth correction pattern obtaining apparatus 500 as depicted in FIG. 5, the change of the intrinsic interference pattern of the Fresnel lens 520 may be observed as an image through the image pickup device 560 at each iteration operation, thereby obtaining a further accurate correction pattern.

A correction pattern obtaining apparatus for correcting noise generated by an optical element included in a display according to an embodiment includes a finished product type display including an optical element for finding a correction pattern and a detector for detecting light emitted from the finished product type display. The method of obtaining a correction pattern disclosed above gains a correction pattern of a desired optical element (for example, a Fresnel lens) by using a finished product type display, and thus, does not require a complicated optical device, such as an optical interferometer of the related art and a well-defined reference light, and accordingly, the method of obtaining a correction pattern may be simplified. Also, since a display of a finished product type is used, the method of obtaining a correction pattern is not related to the size of an optical element included in the display. Accordingly, when the method of obtaining a correction pattern according to an embodiment is used, a correction pattern with respect to an optical element of a large diameter may be easily gained.

According to an embodiment, the processor in any of FIGS. 1-5 may be a data processor implemented as hardware including a circuit having a physical structure for executing desired operations. For example, the desired operations may include code or instructions included in a program. For example, examples of the data processor implemented as hardware may include a microprocessor, a central processing unit, a processor core, a multi-core processor, a multi-processor, an application-specific integrated circuit (ASIC), a field programmable gate array (FPGA), and so forth.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A correction pattern obtaining apparatus comprising:
a flat panel display comprising an optical element that receives a plurality of input test patterns;

a detector configured to measure intensity of light emitted from the flat panel display corresponding to each of the plurality of input test patterns; and a processor configured to determine, after the intensity of light is measured for each of the plurality of input test patterns, a correction pattern having a maximum light intensity obtained by combining a percentage of each of the plurality of input test patterns, the percentage being determined individually for each test pattern, among the plurality of input test patterns, based on the measured intensity of light of the plurality of input test patterns.

2. The correction pattern obtaining apparatus of claim 1, wherein
the flat panel display further comprises:
a light source configured to emit parallel light or non-parallel light; a flat panel that receives the parallel light or the non-parallel light from the light source; and
the optical element through which the parallel light or non-parallel light passes,
wherein the correction pattern is determined based on a characteristic of the optical element.

3. The correction pattern obtaining apparatus of claim 1, wherein
the detector comprises an optical sensor, a size of the optical sensor being less than a diffraction limited spot of the optical element.

4. The correction pattern obtaining apparatus of claim 1, further comprising an element configured to limit light incident to the detector to a single mode, the element being arranged between the flat panel display and the detector.

5. The correction pattern obtaining apparatus of claim 1, further comprising:
a beam splitter configured to split light emitted from the flat panel display into a first direction and a second direction;
a lens; and
an image pickup device,
wherein the detector is arranged in the first direction, and
wherein the lens and the image pickup device are arranged in the second direction.

6. The correction pattern obtaining apparatus of claim 2, wherein
the flat panel comprises a holographic display panel.

7. The correction pattern obtaining apparatus of claim 2, wherein
the optical element comprises a Fresnel lens.

8. The correction pattern obtaining apparatus of claim 2, wherein
the optical element is arranged between the light source and the flat panel.

9. The correction pattern obtaining apparatus of claim 2, wherein
the optical element is arranged between the flat panel and the detector.

10. The correction pattern obtaining apparatus of claim 4, wherein
the element comprises a pinhole mask.

11. The correction pattern obtaining apparatus of claim 4, wherein
the element comprises:
an optical fiber; and
a lens that focuses light incident from the flat panel display onto the optical fiber.

12. A method of obtaining a correction pattern, the method comprising:

sequentially inputting a plurality of input test patterns that are different from each other to a flat panel display comprising an optical element that receives the plurality of input test patterns;
measuring intensity of light emitted from the flat panel display with respect to each of the plurality of input test patterns; and
determining, after the intensity of light is measured for each of the plurality of input test patterns, a correction pattern having a maximum light intensity obtained by combining a percentage of each of the plurality of input test patterns, the percentage being determined individually for each test pattern, among the plurality of input test patterns, based on the measured intensity of light of the plurality of input test patterns.

13. The method of claim 12, wherein
the intensity of light corresponding to each of the plurality of input test patterns is measured by using a detector,
wherein an element configured to limit light incident to the detector to a single mode is arranged between the detector and the flat panel display, and
wherein the plurality of input test patterns comprises two or more test patterns that are different from each other.

14. The method of claim 12, wherein
the flat panel display comprises:
a light source configured to emit parallel light or non-parallel light;
a flat panel that receives the parallel light or the non-parallel light enters from the light source; and
the optical element through which the parallel light or the non-parallel light passes,
wherein the correction pattern is determined based on a characteristic of the optical element.

15. The method of claim 12, wherein
the plurality of input test patterns comprises holographic patterns.

16. The method of claim 13, further comprises:
splitting, by a beam splitter, light emitted from the flat panel display into a first direction and a second direction, wherein the detector is arranged in the first direction, and a lens and an image pickup device are arranged in the second direction.

17. The method of claim 16, further comprising:
confirming a change in light-noise generated from the optical element through the image pickup device before determining the correction pattern.

18. The method of claim 13, wherein
the element comprises a pinhole mask.

19. The method of claim 13, wherein
the element comprises:
an optical fiber; and
a lens that focuses light incident from the flat panel display onto the optical fiber.

20. The method of claim 14, wherein
the flat panel comprises a holographic display panel.

21. The method of claim 14, wherein
the optical element comprises a Fresnel lens.

22. The method of claim 14, wherein
the optical element is arranged between the light source and the flat panel.

23. The method of claim 13, wherein
the optical element is arranged between the flat panel and the detector.

24. A method of obtaining a correction pattern, the method comprising:
inputting a test pattern to a flat panel display comprising an optical element that receives the test pattern;

measuring intensity of light emitted from the flat panel display with respect to the test pattern;

varying the test pattern one or more times by changing a direction of the test pattern by a specific distance based on measuring the intensity of the light; and determining, after varying the test pattern one or more times, a correction pattern based on intensity of light emitted from the flat panel display corresponding to a combination of a percentage of each of the test pattern varied the one or more times.

25. The method of claim 24, wherein after the varying of the test pattern, the varied test pattern is input to the flat panel display, and the inputting, the measuring, and the varying are repeated until a final correction pattern is determined.

26. The method of claim 24, wherein
the test pattern comprises a holographic pattern.

27. The method of claim 24, wherein
the varying of the test pattern further comprises changing a part of the test pattern.

28. The method of claim 24, wherein
the intensity of light is measured by using a detector, and an element configured to limit light incident to the detector to a single mode is arranged between the detector and the flat panel display.

29. The method of claim 24, wherein
the flat panel display comprises:
a light source configured to emit parallel light or non-parallel light;
a flat panel that receives the parallel light or the non-parallel light enters from the light source; and
the optical element through which the parallel light or the non-parallel light passes, wherein the correction pattern is determined based on a characteristic of the optical element.

30. The method of claim 28, further comprising:
splitting, by a beam splitter, light emitted from the flat panel display into a first direction and a second direction,
wherein the detector is arranged in the first direction and a lens and an image pickup device are arranged in the second direction.

31. The method of claim 28, wherein
the element comprises a pinhole mask.

32. The method of claim 28, wherein
the element comprises
an optical fiber; and
a lens that focuses light incident from the flat panel display onto the optical fiber.

33. The method of claim 29, wherein
the flat panel comprises a holographic display panel.

34. The method of claim 29, wherein
the optical element comprises a Fresnel lens.

35. The method of claim 29, wherein
the optical element is arranged between the light source and the flat panel.

36. The method of claim 28, wherein
the optical element is arranged between the flat panel and the detector.

37. The method of claim 30, further comprising:
confirming a change in light-noise generated from the optical element through the image pickup device before determining the correction pattern.

* * * * *